United States Patent [19]

Stewart

[11] Patent Number: 4,753,704

[45] Date of Patent: Jun. 28, 1988

[54] PROCESS USING LIGHT AND LIGHT ACTIVATED ADHESIVE COMPOSITIONS TO SECURE LIGHT OPAQUE END CAPS TO FLUORESCENT TUBES

[75] Inventor: John J. Stewart, Meriden, Conn.

[73] Assignee: Loctite Corporation, Newington, Conn.

[21] Appl. No.: 879,680

[22] Filed: Jun. 30, 1986

[51] Int. Cl.⁴ .............................................. H01J 9/34
[52] U.S. Cl. .................................. 156/275.5; 156/69; 156/275.3; 156/275.7; 156/294; 156/303.1; 250/492.1; 427/54.1; 427/67; 445/26
[58] Field of Search ............... 428/36; 427/67, 54.1; 313/318, 493; 445/26; 250/492.1; 350/168-169; 156/69, 272.2, 272.4, 273.5, 294, 273.9, 275.1, 275.3, 275.5, 275.7, 293, 303.1, 308.4, 309.6

[56] References Cited

U.S. PATENT DOCUMENTS

| | | | |
|---|---|---|---|
| 2,312,245 | 2/1943 | Flaws, Jr. | 445/26 |
| 3,179,802 | 4/1965 | Hall, Jr. | 250/492.1 |
| 3,282,669 | 11/1966 | Pinkham | 156/272.2 |
| 3,784,524 | 1/1974 | Morgan | 522/90 |
| 3,804,691 | 4/1974 | Trivedi | 156/272.2 |
| 3,948,740 | 4/1976 | Phalangas | 552/62 |
| 4,022,855 | 5/1977 | Hamblen | 264/1.4 |
| 4,056,421 | 11/1977 | Jarvis | 156/275.5 |
| 4,222,635 | 9/1980 | Jülke | 156/275.5 |
| 4,222,835 | 9/1980 | Dixon | 522/13 |
| 4,272,589 | 6/1981 | Dubois | 156/275.5 |
| 4,309,334 | 1/1982 | Valitsky | 521/54 |
| 4,326,324 | 4/1982 | Stephens | 445/26 |
| 4,406,764 | 9/1983 | Hagase et al. | 522/11 |
| 4,407,759 | 10/1983 | Crivello | 556/76 |
| 4,428,807 | 1/1984 | Lee et al. | 427/54.1 |
| 4,506,189 | 3/1985 | Nolan | 427/67 |
| 4,510,415 | 4/1985 | Ogata | 445/26 |
| 4,560,357 | 12/1985 | Bouchard | 445/26 |

Primary Examiner—Merrell C. Cashion, Jr.
Attorney, Agent, or Firm—Vidas & Arrett

[57] ABSTRACT

The use of radiant energy and a radiation curable adhesive to bond components to glass where direct irradiation proves impossible is disclosed. The process utilizes the light scattering properties of glass to convey radiant light energy along an axis generally perpendicular to the incident radiant light resulting in cure of adhesive in shadow areas. The process finds particular utility in the bonding of light opaque end caps to fluorescent tubes.

11 Claims, 1 Drawing Sheet

PROCESS USING LIGHT AND LIGHT ACTIVATED ADHESIVE COMPOSITIONS TO SECURE LIGHT OPAQUE END CAPS TO FLUORESCENT TUBES

BACKGROUND OF THE INVENTION

This invention relates to a process of using radiant energy combined with a radiation curable adhesive to bond components to glass where direct irradiation proves impossible. More particularly, the process utilizes the light scattering properties of glass to convey light energy along an axis generally perpendicular to the incident light, thus permitting cure of adhesive in shadow areas. Accordingly, the process can be used to bond a variety of components to glass utilizing radiant curing systems in areas not directly accessible to the applied light. The process derives particular utility in the bonding of light opaque end caps to fluorescent tubes.

Basically, there are four main sources of radiant energy: gamma rays, high energy electrons, neutrons, and ultraviolet. Each of these sources has its respective advantages and disadvantages. The use of radiant energy to cure polymeric coatings or adhesives is of fairly recent origin, and it is only in the last several years that the two most commercially attractive sources, ultraviolet and electron beam, have been developed for use in industry.

Typically, radiation curable compositions comprise various reactive components which cure by polymerization through free radical or ionic mechanisms. Each component is intended to perform a specific function in both the uncured composition and the cured product. The components include, (1) a reactive low-to-medium weight polymer, generally referred to as an oligomer, which imparts primary performance characteristics to the cured product;

(2) monofunctional and polyfunctional reactive monomers which can contribute to the degree of crosslinking required in the cured product and otherwise function as a reactive diluent to adjust the viscosity of the formulation to a level suitable for application; and (3) various non-reactive, specialty compounds such as fillers, colorants, slip agents and release agents, which are added for various end-use properties.

A characteristic feature of such 100 percent reactive compositions is the substantial absence of conventional inert volatile solvents. Even though inert, such solvents often have disadvantages of flammability, toxic hazards to workers, pollution of atmosphere and high cost. Such solvent-free systems provide high-performance formulations which can be cured at high line speeds by exposure to actinic radiation or ionizing radiation in either inert or oxygen-containing atmospheres.

Since ultraviolet light is one of the most widely used types of radiation because of its relatively low cost, ease of maintenance and low potential hazard to industrial users, rapid photo-induced polymerizations utilizing UV light rather than thermal energy for the curing of adhesives offer several significant advantages. First, faster curing materials off substantial economic benefits. Furthermore, heat sensitive material can be safely coated or bonded and cured with UV light without the use of thermal energy which could damage the substrate. Additionally, the essentially solvent free media reduces the necessity for expensive and time consuming pollution abatement procedures. Accordingly, UV curing systems, largely due to the above-identified advantages, have been met with increased usage in industrial settings.

While industrial use of UV curing systems has increased over the years, their use has been limited to cases where direct application of UV light to a substrate was necessary to effectuate cure. Accordingly, it is an object of the present invention to provide a new and improved use of conventional curing systems which utilizes the light transmitting properties of glass to convey UV light energy along an axis perpendicular to the incident UV light to cure an adhesive in an area not directly accessible to the applied UV light. It is a further object of the present invention to disclose a process using light and light activated adhesive compositions to secure light opaque end caps to fluorescent tubes.

SUMMARY OF THE INVENTION

The invention is a novel application of radiant energy and radiation curable adhesives to bond light opaque end caps to fluorescent tubes. The process utilizes the light scattering properties of glass to convey light energy along an axis generally perpendicular to the incident light to cure an adhesive in an area not directly accessible to the applied light. As a preferred embodiment, the process utilizes UV energy and a UV curable adhesive.

More particularly the invention is a process for curing a radiation curable adhesive layer between a first irradiation opaque substrate and a second radiation transmissive substrate, said second substrate extending longitudinally beyond the edge of the first substrate and having a radiation inaccessible portion defined by the area of overlap of the first substrate over the second substrate, the process comprising irradiating the second substrate in a direction generally perpendicular to the second substrate, on the portion thereof extending beyond the first substrate so as to scatter sufficient radiation longitudinally through the second substrate into the adhesive layer for sufficient time to cause the adhesive layer to cure.

Figure 1:
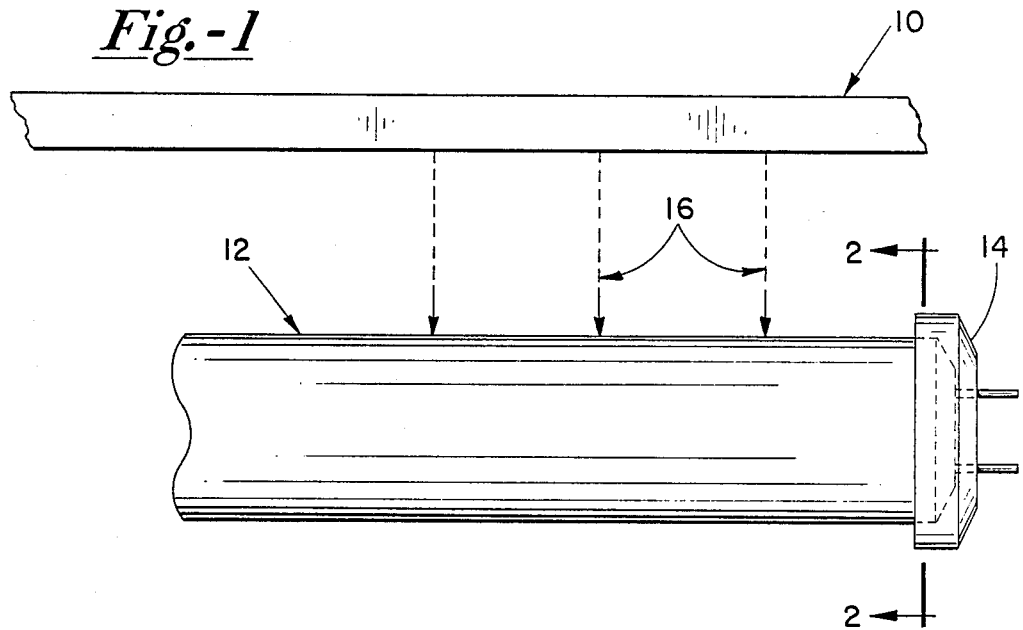
FIG. 1 is a top plan view of a fluorescent tube portion showing an end cap and a UV source. A radiant light source (10) preferably a UV lamp, is directed at a fluorescent tube (12) containing an end cap (14). The direction of generated radiation is indicated by dashed arrows (16). The fluorescent tube (12) with end cap (14) is located perpendicular to the direction of radiation such that the radiation strikes the tube in the vicinity of the end caps (14).
Figure 2:
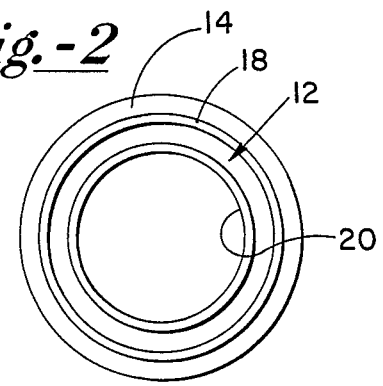
FIG. 2 is a sectional view of a capped fluorescent tube taken along line 2 of FIG. 1. An adhesive layer (18) is situated between the end cap (14) and fluorescent tube (12). A layer of UV absorbing fluorescent phosphor material is indicated by numeral 20.

When radiation strikes the glass tube (12) a portion of it is transmitted along the length of the tube under the end cap where it contacts the adhesive layer (18), inducing polymerization thereof so as to give it a bonded structural assembly.

DETAILED DESCRIPTION OF INVENTION

The use of UV radiation to effectuate cure of resinous material is well known in the art. U.S. Pat. Nos. 3,948,740, and 4,022,855 disclose the polymerization of an ethylenically unsaturated monomer composition containing peroxides or azo compounds by exposure to ionizing radiation such as x-rays. U.S. Pat. No. 3,784,524 discloses UV curing of resins containing photoinitiators.

The light transmitting properties of glass are disclosed by Valitsky in U.S. Pat. No. 4,309,334, wherein it is taught that glass filler comprising a mixture of glass microballoons, glass beads, and optionally, milled glass fibers, when added to a curable adhesive, facilitate the transmission of ultraviolet radiation throughout the entire thickness of the substrate, thereby permitting uniform and complete cure through relatively thick bonds; at least 5 mils or more.

In-depth curing of resins in shadow areas is disclosed by Dixon in U.S. Pat. No. 4,222,835. To work his invention, Dixon employs a thermal initiator and a photoinitiator which act synergistically with UV light so that the depth of cure achieved is much greater than when either are used along. The presence of a thermal initiator is crucial to Dixon's composition due to its role in initiating the polymerization of the monomer when it is heated as a result of the exothermic polymerization reaction initiated by the photoinitiator.

The present invention represents a new and improved method of curing adhesive in shadow areas. Unlike the teachings of Valitsky, the present invention utilizes the light scattering properties of glass to convey light energy along an axis generally perpendicular to the incident light (rather than through the glass) to cure an adhesive in an area not directly accessible to the applied light. Unlike the teachings of Dixon, heat is not necessary to effectuate cure.

The present invention lends itself to a variety of uses. While the identified technique finds utility in the bonding of components to glass substrates where direct irradiation proves impossible, the process finds particular utility in the bonding of light opaque end caps to fluorescent tubes.

Existing systems used to bond end caps on fluorescent tubes consist of mixtures of resins and additives which require heat curing at elevated temperatures for two to five minutes. The mixing and application of these products is both time consuming and labor intensive. Accordingly, the present invention represents a viable means of automating the assembly process, thereby saving time and labor.

The concept of curing an adhesive in shadow areas via radiant energy is dependent on the ability of the glass substrate to scatter radiant energy 'along' rather than 'through' the glass which has a radiation-absorbing coating on the inner wall. Any light energy of a wavelength that can be transmitted along glass can be used in this process, with UV energy being the preferred embodiment. Suitable adhesives are commercially available. Examples include Loctite 350-354. Useful epoxy formulations are published in U.S. Pat. Nos. 4,428,807, 4,407,759 and 4,406,764. Suitable visible light curing materials are described in EPO No. 147226.

The invention may be illustrated by the following nonlimiting examples:

EXAMPLE 1

To test the UV energy scattering ability of the glass substrate, a soda glass tube, partly enclosed by a UV opaque box and containing a UV absorbing coating on its inner wall, was subjected to a medium pressure Hg UV source of 300 W/M. UV Power meters Model 206 were placed directly beneath the tube perpendicular to the incident light and at the tube end within the UV opaque box. Following irradiation, measurements made directly below the glass were 100 mw/cm$^2$. UV energy measurements inside of the opaque box at the end of the glass section was 5 mw/cm$^2$.

EXAMPLE 2

To confirm that adequate UV energy is transmitted "along" the glass to enable cure of a suitable adhesive, UV adhesive 350 was applied to the inside edge of an aluminum end cap which was positioned on the end of a fluorescent tube to ensure contact of the adhesive to both glass and aluminum. Reflective aluminum foil was placed over the end of the cap and extended 2 inches along the glass tube. Irradiating the exposed glass approximately 20 seconds at 80 mw/cms provided an adequately strong bond that could not be delaminated by torque or tensile action.

EXAMPLE 3

Experiments were conducted using Loctite UV adhesive 350 to check performance and durability of adhesive bond for end cap sealing of North American Phillips 40 W fluorescent tubes. Bonds were produced as in Example 2.

To test the bond strength resistance to water immersion, three bonds were submerged at room temperature for 41 days. At the end of this period, the samples were removed. While one of the three tubes exhibited substrate (glass) failure, the retentive bond strength of all three remained intact.

A second series of tests was performed whereby the tubes were subjected to thermal cycling ranging from 40° C.–120° C. All six units tested successfully, exhibiting no indication of delamination, stress cracking or bond failure. The same six units were confined for 30 days at temperatures ranging to 120° F. under conditions of saturated humidity. None of the six units showed signs of delamination. Two units subsequently subjected to torque tests exhibited substrate failure.

EXAMPLE 4

An experiment was conducted as described in Example 2, utilizing a UV responsive mixture of cycloaliphatic epoxy resins and a cationic photoinitiator from GE (UVE 1014). The cure time resulting from this system was 2 to 3 times greater than when 350 adhesive was employed. The resulting bond was adequately strong.

EXAMPLE 5

An experiment was conducted as described in Example 2, with an adhesive composition comprising urethane acrylate resin, mixtures of mono, di, trifunctional acrylate monomers and an initiator comprising 2,7 (t-butylperoxycarbonyl)fluoren-9-one. Exclusively, visible light was produced by inserting a ⅜" UV stabilized polycarbonate filler between a Fusion System visible light source and the fluorescent tube.

I claim:

1. A process for curing a radiation curable adhesive layer between a first irradiation opaque substrate and a second radiation transmissive substrate, said second substrate extending longitudinally beyond the edge of the first substrate and having a radiation inaccessible portion defined by the area of overlap of the first substrate over the second substrate, the process comprising irradiating the second substrate in a direction generally perpendicular to the second substrate, on the portion thereof extending beyond the first substrate so as to scatter sufficient radiation longitudinally through the second substrate into the adhesive layer for sufficient time to cause the adhesive layer to cure.

2. A process as described in claim 1 wherein the radiant light energy employed is UV light energy.

3. A process as in claim 1 wherein the radiation transmissive substrate is glass.

4. A process as in claim 1 wherein the adhesive is an acrylic adhesive.

5. A process as in claim 1 wherein the adhesive comprises cationically polymerizable material.

6. A process as in claim 5 wherein the adhesive comprises an epoxy compound and a cationic photoinitiator.

7. A process as in claim 1 wherein the radiant energy employed in electron beam radiation.

8. A process in claim 1 wherein the radiant energy employed is visible light energy.

9. A process for cuing a layer of radiation curable adhesive between facing sides of first and second substrates, said adhesive being curable with radiation of a type selected from visible, UV and electron beam radiation, said first substrate being opaque to the type of radiation which cures said adhesive and said second substrate characterized in that the side of the second substrate which faces said first substrate extends beyond the edge of the first substrate and said second substrate is comprised of a material which is generally transmissive of the type of radiation which cures said adhesive but which scatters a portion of said radiation along said second substrate in a direction generally perpendicular to the incident radiation, said process comprising irradiating the side of said second substrate facing said first substrate on the portion thereof extending beyond the first substrate in a direction generally perpendicular thereto with radiation of the type which cures said adhesive for sufficient time to cure the adhesive layer between the first and second layers.

10. A process as in claim 10 wherein the second substrate is glass.

11. A process as in claim 12 wherein the adhesive is a UV curing adhesive and the radiation is UV light.

* * * * *